United States Patent

Dillon

[15] 3,689,958
[45] Sept. 12, 1972

[54] FOWL PROCESSING SYSTEM

[72] Inventor: Janus J. Dillon, Irving, Tex.
[73] Assignee: Food Equipment, Inc., Dallas, Tex.
[22] Filed: Dec. 11, 1970
[21] Appl. No.: 97,091

[52] U.S. Cl. ............................17/11, 62/63, 134/171
[51] Int. Cl. ........................A22c 21/00, A22c 21/04
[58] Field of Search......17/11, 11.2, 1 R, 14; 134/32, 134/59, 123, 165, 171; 62/63, 64

[56] References Cited

UNITED STATES PATENTS

| | | | |
|---|---|---|---|
| 3,561,040 | 2/1971 | Floden | 17/11.2 |
| 2,329,226 | 9/1943 | Stafford et al. | 62/64 |
| 2,942,429 | 6/1960 | Van Dolah et al. | 17/11 X |
| 1,866,197 | 7/1932 | Cunningham | 134/123 |
| 2,419,397 | 4/1947 | Frohoff et al. | 134/123 |
| 3,231,424 | 1/1966 | Evans et al. | 134/32 X |
| 2,661,310 | 12/1053 | Page et al. | 134/32 UX |

FOREIGN PATENTS OR APPLICATIONS 1,019,278   2/1966   Great Britain.............134/180

Primary Examiner—Samuel Koren
Assistant Examiner—J. F. Pitrelli
Attorney—Richard, Harris & Hubbard

[57] ABSTRACT

The specification discloses a system for cleaning and chilling fowl carcasses and also for cleaning the fowl conveying shackles. The system includes a housing through which shackles are transported. Lower spray discharge nozzles are mounted in the housing for selectively applying a cleaning fluid and then a chilling fluid to the fowl carcasses carried by the shackles. Upper spray discharge nozzles are also mounted in the housing for selectively applying pressurized cleaning fluid to the shackles.

2 Claims, 3 Drawing Figures

PATENTED SEP 12 1972

3,689,958

INVENTOR:
JANUS J. DILLON

Richards, Harris & Hubbard
ATTORNEYS

FOWL PROCESSING SYSTEM

FIELD OF THE INVENTION

This invention relates to animal processing systems, and more particularly to systems for cleaning and chilling animal carcasses in combination with a system for cleaning the shackles used to convey the animal carcasses.

THE PRIOR ART

Overhead conveyors are commonly used for transporting a plurality of shackles along a treating path in various animal processing plants. Animal carcasses are hung from the shackles and are sequentially subjected to a variety of processing steps. For example, in fowl processing plants, fowl are hung by the feet from shackles and are transported through a killing station, a scalding or steam spray station, a feather picking station and an evisceration station. The fowl are then generally rinsed and then dropped from the shackles into a water and ice filled chill tank. Paddle conveyors slowly move the fowl through the chill tank and then deposit the chilled fowls on a conveyor for further processing and packaging.

Such conventional chill tanks are unsatisfactory from a sanitary viewpoint, as blood, feathers, offal and the like tend to accumulate in the chilled water. Cross contamination of the fowl thus may occur due to the presence of a few diseased fowl. Additionally, the shackles utilized in such overhead conveying systems normally become covered with blood, feathers, fats and other deposits as a result of the previously described processing steps. For sanitation purposes, it is thus desirable to periodically clean and sanitize the shackles to prevent buildup of bacterial growth and also to prevent the clogging of the moving parts of the conveyor and the shackles.

SUMMARY OF THE INVENTION

In accordance with the present invention, a compact system is provided wherein effective rinsing of the defeathered fowl, sanitary chilling of the fowl and effective sanitation and cleaning of the shackles may be selectively accomplished at one location.

In accordance with a more specific aspect of the present invention, a system is provided for cleaning conveying shackles and for chilling animal carcasses being transported by the shackles. The shackles are transported through a housing, with upper spray discharge nozzles being mounted in the housing for selectively applying pressurized cleaning fluid to the shackles. Lower spray discharge nozzles are mounted in the housing for selectively applying a chilling fluid to the carcasses carried by the shackles. Additional lower spray discharge nozzles are provided to direct a rinsing spray to the carcass carried by the shackles prior to the chilling thereof. Valving structure selectively controls the actuation of each of the spray discharge nozzles.

In accordance with a more specific aspect of the invention, a fowl processing station includes a housing through which shackles carry defeathered fowl carcasses. A first set of spray nozzles are mounted in the housing and are operable to direct oscillating pressurized cleaning fluid spray upon the fowl carcasses for cleaning thereof. A second set of spray nozzles are mounted in the housing and are operable to direct an oscillating chilling fluid spray upon the fowl carcasses. A third set of spray nozzles are mounted in the housing and are operable to direct an oscillating pressurized spray of fluid upon the shackles moving through the housing for cleaning thereof when desired.

DESCRIPTION OF THE DRAWINGS

For a more complete understanding of the invention, and for further objects and advantages thereof, reference is now made to the following description taken in conjunction with the accompanying drawings, in which.

DESCRIPTION OF THE PREFERRED EMBODIMENT

Figure 1:
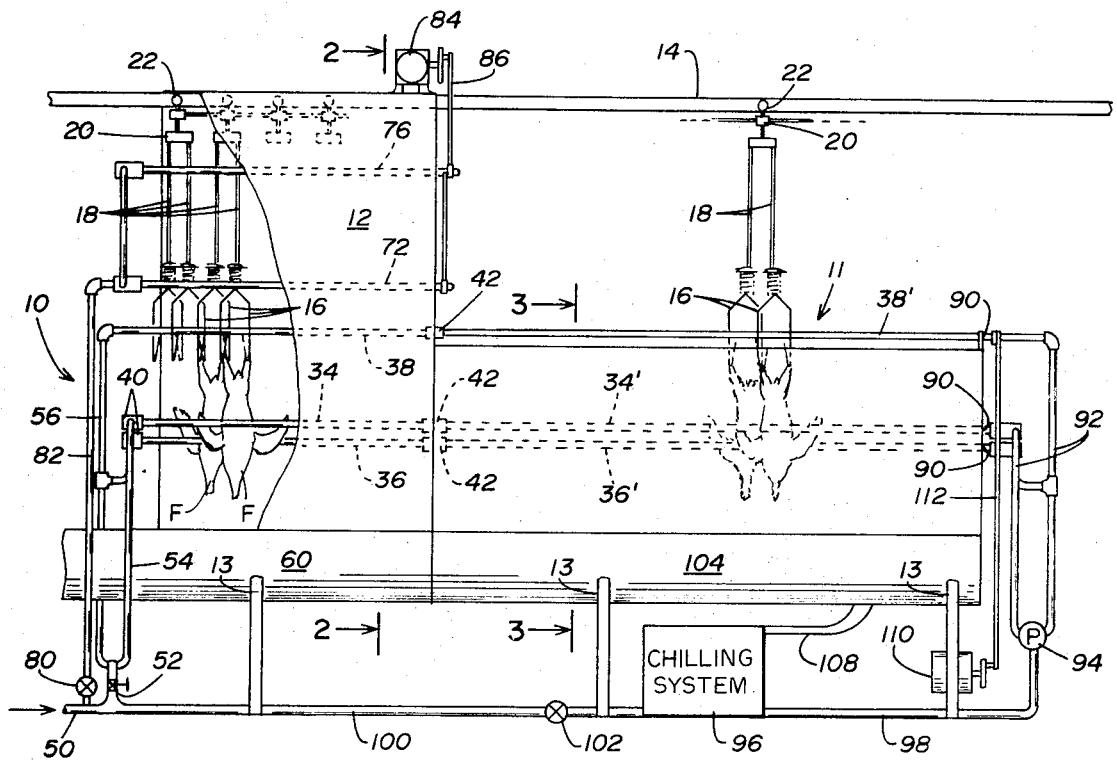
FIG. 1 is a side view, partially broken away, of the preferred embodiment of the present invention.

The present system is shown in FIG. 1, wherein a fowl rinsing section is generally identified by the numeral 10, a fowl chilling section is generally identified by the numeral 11 and a shackle washing portion is generally identified by numeral 12. The housing is maintained a prescribed distance above the processing plant floor by support pedestals 13. An overhead conveyor 14 extends through the housing and a plurality of shackles 16 are hung in the conventional manner from chains 18 attached to blocks 20. Blocks 20 are connected to rollers 22 which roll along the lower flange of the overhead conveyor 14. While in practice each of the shackles 16 supports a fowl carcass, in FIG. 1 only two fowls F are shown for ease of illustration.

Figure 2:
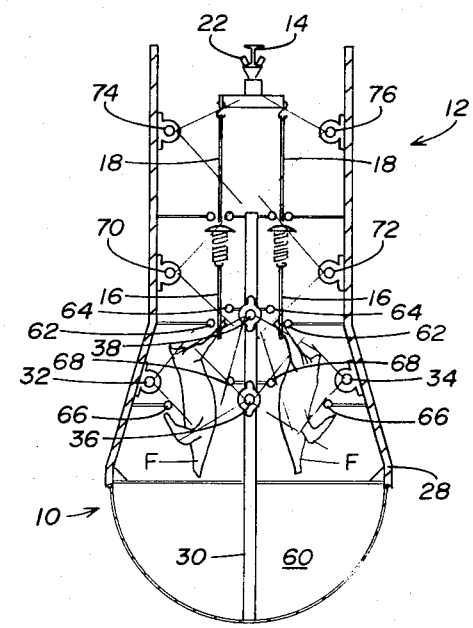
FIG. 2 is a sectional view taken generally along the section lines 2—2 of the system shown in FIG. 1.

In operation of the system, the fowl are transported from left to right along the overhead conveyor 14. As best shown in FIG. 2, the shackles 16 pass through the shackle washing housing 12, while the fowl F pass through a lower housing 28 having a generally circular cross section. A middle dividing wall 30 extends along the length of the housing to separate the fowl hanging from adjacent shackles on each block 20. As shown in FIG. 1, each pair of shackles 16 hanging from a block 20 are slightly offset in the direction of the path of travel of the overhead conveyor 14, in order to provide adequate coverage of the fowl with treating fluids according to the invention.

A set of oscillating spray nozzle pipes 32, 34, 36 and 38 are mounted along the length of the lower housing 28. As shown in FIG. 1, the pipes are journaled at either end in bearings 40 and 42 so that the pipes may be rotated about their longitudinal axis. A plurality of spray nozzles are formed along the length of each of the pipes 32–38. A supply of tap water is fed via an inlet 50 and through a valve 52 and pipes 54 and 56 which are connected to each of the pipes 32–38. Each of the pipes 32–38 are blocked off in the region of bearings 42. A trough 60 is formed in the bottom of the housing to collect water sprayed from the pipes 32–38 and to flow the collected water out to a collection location. As best shown in FIG. 2, guide rails 62 and 64 extend along the length of the housing in order to maintain the shackles 16 in a predetermined position during travel through the housing. Similarly, guide rails 66 and 68 are positioned along the lower housing 28 in order to maintain the fowl F in a predetermined orientation during travel through the housing.

The shackle washing system is located in the upper housing 12 and comprises four pipes 70, 72, 74 and 76 extending along the length of the shackle washing housing 12. Each of the pipes 70–76 are journaled for rotation about the longitudinal axis thereof and each of the pipes 70–76 includes a plurality of nozzles spaced along the length thereof. Tap water flowing through the inlet pipe 50 is passed through a manually operable valve 80 and through pipe 82 for admission into each of the pipes 70–76. A motor 84 is mounted on top of the housing 12, with a rod 86 being eccentrically mounted on the output shaft of the motor 84. The lower end of the rod 86 is connected to the ends of each of the pipes 70–76, such that operation of the motor 84 causes the pipes to oscillate about a prescribed angle. Water emitted from the nozzles along the pipes 70–76 falls to the bottom of the housing 28, where it is collected in the trough 60.

Figure 3:
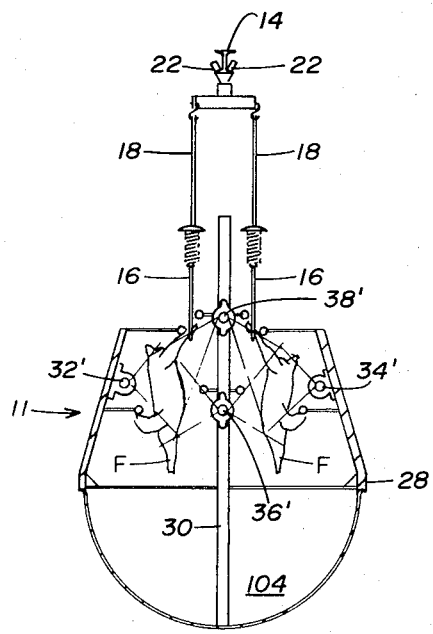
FIG. 3 is a sectional view taken generally along the section lines 3—3 of the system shown in FIG. 1.

The fowl chilling section 11 of the present system includes an extension of the housing 28 and is best shown in FIGS. 1 and 3. The divider wall 30 extends through the fowl chilling section 11. Elongated pipes 32', 34', 36' and 38' extend coextensively with the corresponding pipes 32–38 and are respectively journaled for rotation at one end within the bearings 42. Pipes 32'–38' are journaled for rotation at the other end within bearings 90 and are connected to chilled water inlet pipes 92. A pump 94 receives chilled water or other fluid from a chilling system 96 through a supply pipe 98. Tap water is fed to the chilling system 96 via the inlet pipe 50, a pipe section 100 and through a valve 102. The bottom of the chilling chamber defines a trough 104 which collects the excess sprayed chilling solution and directs the fluid through an outlet pipe 108 to the heat exchanger coils of the chilling system 96, in order to assist in the operation of the refrigeration unit of the chilling system 96.

A suitable electric motor 110 is mounted upon one of the pedestals 13 and includes an output shaft eccentrically connected to one end of a pair of rods 112. The rods 112 extend upwardly and are connected to extensions from each of the pipes 32', 34', 36', and 38'. Upon operation of the motor 110, the rods 112 are provided with a vertical oscillation in order to oscillate each of the pipes 32'–38' about a prescribed angle. Each of the pipes 32'–38' are provided with a plurality of spray nozzles along the length thereof. Due to the supply of chilled water applied to the pipes 32'–38', an oscillating spray of chilled water is thus directed upon fowl being transported through the chilling section in order to substantially reduce the temperature of the fowl. In some instances, other techniques for reducing the temperature may be utilized with the system, such as a cold air blast, a $CO_2$ blast and the use of an additional chill chamber, if desired. As shown in FIG. 3, guide rods are also provided in the chill chamber section 11 in order to maintain the fowl in a prescribed orientation during passage through the chill chamber section 11.

In operation of the system when processing fowl, valve 80 is closed and valves 52 and 102 are opened. Motor 110 is energized. Fowl are than transported through the rinse chamber 10 in the manner illustrated and oscillating sprays of cold tap water are directed upon a total area of the fowl by the oscillating fluid sprays from pipes 32, 34, 36 and 38. The rinse water then falls to the trough 60 and is carried away. The rinsed fowls are then carried through the chill chamber section 11, wherein extremely cold sprays of liquid are directed upon the total area of the fowl by means of the oscillating spray pipes 32'–38'. The chilled liquid then falls into the trough 104 and is carried to the chilling system 96 to assist in refrigeration of additional chilled water. Due to the fact that each fowl is sprayed with sanitary chilled water, there is no intermingling of waste and thus no transmittal of germs and the like between adjacent birds. The continued spray action of the system maintains the system in an extremely sanitary condition throughout continuous operation thereof. The oscillating spray operation of the system provides even distribution of rinse and chilling spray upon the birds and provides excellent coverage of all portions of the birds, even with close spacing of fowl along the conveyor line.

When the fowl processing operation is concluded, and it is desired to wash the shackles 16, valve 80 is opened and valves 52 and 102 are closed. If desired, an automatic timing system may be utilized to perform valve closing operations. Motor 84 is energized and motor 110 is deenergized. The pipes 70, 72, 74 and 76 are thus oscillated and cleaning fluid is sprayed at high pressure against the chains 18 and the shackles 16 in order to clean the shackles of blood, fat and other collected residue. If desired, soap products may be applied through the oscillating pipes and the shackles cycled through the shackle cleaning section a plurality of times until the desired cleaning action is provided.

It will thus be seen that the present invention provides an extremely compact and yet efficient and sanitary unit for providing rinsing and chilling operations to fowl and other animal carcasses, and for subsequently providing cleaning operations to the conveying shackles.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. In a system for cleaning conveying shackles and for chilling animal carcasses being transported by the shackles, the combination comprising:
   a housing through which said shackles are transported,
   a first spray assembly mounted in said housing and operable to direct pressurized cleaning fluid upon the animal carcasses for cleaning thereof,
   a second spray assembly mounted in the upper portion of said housing and including elongated pipes disposed on opposite sides of the path of travel of said shackles, said pipes having spray nozzles disposed along the length thereof and being oscillated for a prescribed angle about the longitudinal axis thereof to selectively apply pressurized cleaning fluid to the shackles, a third spray assembly mounted in the lower portion of said housing rearwardly of said first spray assembly and including elongated pipes having nozzles disposed along the length thereof, said pipes being oscillated about a prescribed angle to selectively apply a chilling fluid to the animal carcasses carried by the shackles, and valving means for selectively controlling the actuation of said spray assemblies wherein the animal carcasses may be cleaned and chilled and the shackles subsequently cleaned.

2. The combination of claim 1 and further comprising:

heat exchange means for chilling fluid, a trough disposed beneath said third spray assembly for collecting fluid after application to the carcasses, means for conveying the collected fluid from said trough to said heat exchange means for chilling said fluid, and means for conveying the chilled fluid to said third spray assembly.

* * * * *